United States Patent Office.

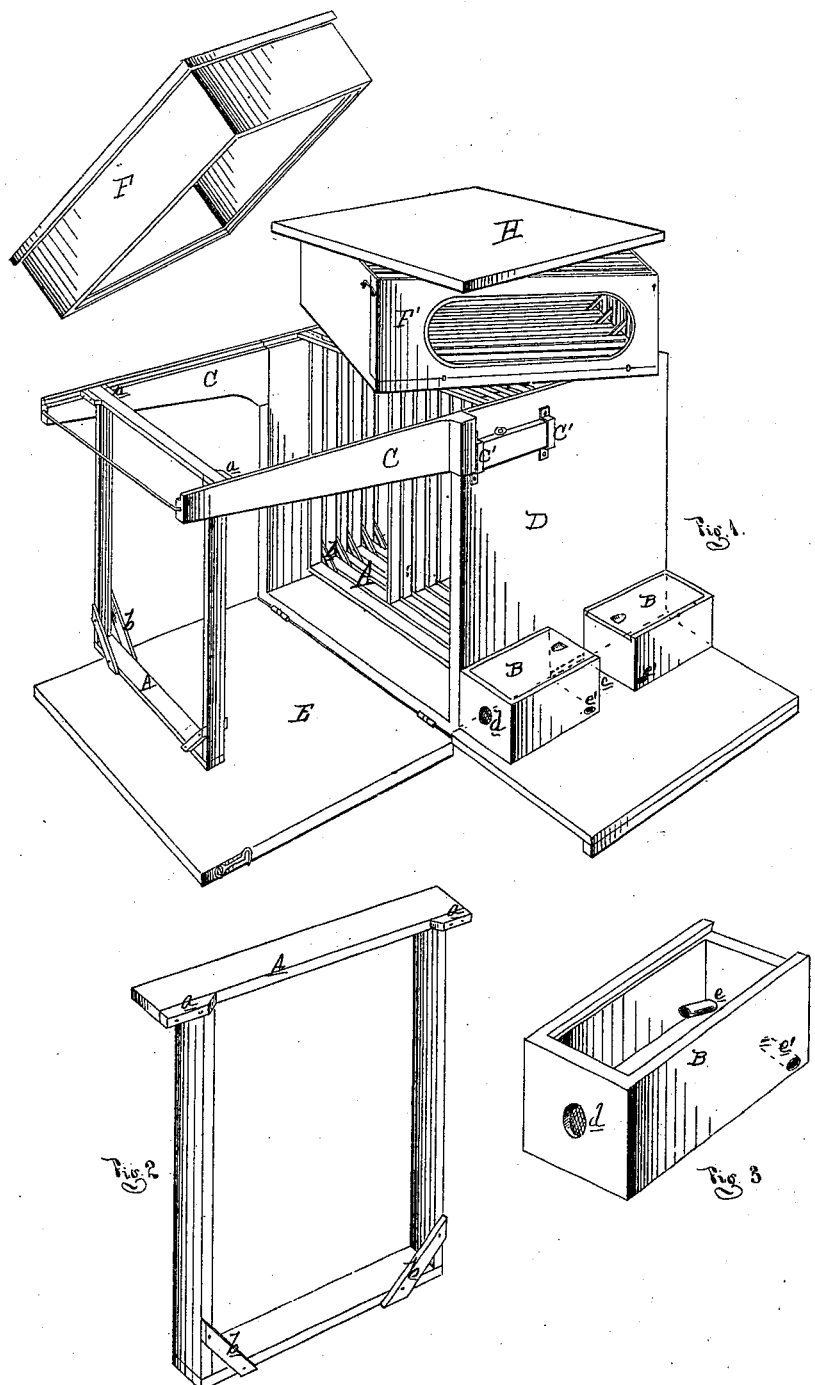

WASHINGTON J. KELLY, OF COMMERCE, MICHIGAN.

Letters Patent No. 112,813, dated March 21, 1871.

IMPROVEMENT IN BEE-HIVES.

The Schedule referred to in these Letters Patent and making part of the same.

*To whom it may concern:*

Be it known that I, WASHINGTON J. KELLY, of Commerce, in the county of Oakland and State of Michigan, have invented a new and useful Improvement in a Bee-Hive; and I do declare that the following is a true and accurate description thereof, reference being had to the accompanying drawing and to the letters of reference marked thereon and being a part of this specification, in which—

Figure 1 is a perspective of my hive with the side door open, the cap removed, the cap-box and honey-board partially detached, and frame-supporting arms attached.

Figure 2 is a perspective view of my improved comb-frame.

Figure 3 is a perspective view of a moth-trap with cover removed.

Like letters indicate like parts in each figure.

The nature of this invention relates to an improvement in bee-hives, and consists in the construction and combination of its several principal parts, arranged and operating as more fully hereinafter described.

In the drawing—

A represents my comb-frames, which are of the usual construction, except that at the upper corners on one side I place stops $a$, and at the lower corners of the same side diagonal braces $b$, of the same thickness, which also serve as stops; the stops serve to keep the frames a slight distance apart, and thus prevent the bees from joining them in forming the comb; the braces keep them from being twisted away when, as frequently occurs, the bees start the comb from one corner; with unbraced frames the free passage of the bees around their ends is apt to be interrupted from the cause above recited.

The projecting ends of the top bar of each frame rest on a ledge in the top of the front and rear walls of the shell or case of the hive, which is provided with a cap, F, in which is placed a honey-box, F′, which is also provided with the comb-frames of the construction already described, except that, being shallow, but one stop is needed in each, and which is placed in the middle of the top bar.

One side of the hive-case is hinged at the bottom to open downward, forming a door, E.

C′ are staples in the upper side of the front and rear walls, in which are inserted the arms C, so arranged as to afford a prolongation of the ledges which support the comb-frames in the hive; on these arms the frames may be drawn out in handling the bees, and replaced without injuring the comb, when the arms are removed and the door closed again.

B are moth-traps, one of which is placed at either side of the entrance $c$.

These traps consist simply of a rectangular box with a sliding cover, and provided at their ends farthest from the entrance to the hive with an opening, $d$, covered with wire-gauze; at their front inner corners they are provided with a flattened tube, $e$, leading upward and into the interior. Similar tubes, $e'$, in like manner enter them from near the hive entrance in their ends; these tubes are but just large enough to admit a moth, which, on entering, sees the light at the other end of the box and seeks to escape only in that direction; the tubes keeping the other end of the box darkened, the moth seeking to enter the hive would naturally pass into the first opening which presents itself, one of the tubes $e$, but as the bees entering and leaving the hive protect the entrance should he approach nearer thereto, preferably he would take one of the tubes $e'$ instead of the crowded and busy entrance.

In starting a colony in a fresh hive it is necessary that the bees should be confined in their future home, the hive proper, until the combs are well under way; for this purpose the honey-board H is provided, to be placed over the main comb-frames until the bees are to be admitted to the cap, when it may be removed and placed over the frames in the cap to prevent them from working in the cap proper.

If it be discovered that robber-bees are attacking the hive, they may be prevented from entering by closing the entrance with the moth-traps.

What I claim as my invention, and desire to secure by Letters Patent, is—

The combination, in a bee-hive, of the case D, the cap F, honey-box F′, provided with comb-frames, moth-traps B, detachable comb-frames A, and door E, the several parts being constructed, arranged, and operated substantially as described and shown.

WASHINGTON J. KELLY.

Witnesses:
 THOS. S. SPRAGUE,
 M. STEWART.